United States Patent [19]
Smith

[11] Patent Number: 5,257,836
[45] Date of Patent: Nov. 2, 1993

[54] STAB JOINT COUPLER

[75] Inventor: Peter J. Smith, Guelph, Canada

[73] Assignee: Armtec Inc., Guelph, Canada

[21] Appl. No.: 858,708

[22] Filed: Mar. 27, 1992

[51] Int. Cl.⁵ ............................................. F16L 17/02
[52] U.S. Cl. .................................. 285/374; 285/392; 285/404; 285/903
[58] Field of Search ............... 285/404, 903, 7, 12, 285/392, 374

[56] References Cited

U.S. PATENT DOCUMENTS

| | | |
|---|---|---|
| 559,642 | 5/1896 | Watson . |
| 897,416 | 9/1908 | Schlafly . |
| 919,997 | 4/1909 | Zelch . |
| 1,079,681 | 11/1913 | Wintroath ........................ 285/404 X |
| 1,570,155 | 1/1926 | Karbowski ...................... 285/392 X |
| 2,259,737 | 10/1941 | Cunningham ..................... 285/404 |
| 3,017,654 | 1/1962 | Allenby et al. ..................... 285/7 X |
| 3,565,464 | 2/1971 | Wolf ............................... 265/392 X |
| 4,222,594 | 9/1980 | Skinner . |
| 4,625,998 | 12/1986 | Droudt et al. ........................ 285/7 |
| 4,913,473 | 4/1990 | Bonnema et al. . |
| 5,072,972 | 12/1991 | Justice . |
| 5,131,693 | 7/1992 | Miller ............................. 285/903 X |

FOREIGN PATENT DOCUMENTS

| | | | |
|---|---|---|---|
| 2402892 | 8/1974 | Fed. Rep. of Germany | ...... 285/903 |
| 2633678 | 2/1978 | Fed. Rep. of Germany | ...... 285/903 |

*Primary Examiner*—Dave W. Arola
*Attorney, Agent, or Firm*—Ridout & Maybee

[57] ABSTRACT

A stab joint coupling, for joining corrugated pipes, has a male connector and a female connector both having means for attachment to a first and second piece of pipe by engaging the corrugation of the pipe. A circumferential elastomeric sealing means is positioned between the joined coupling connectors to effect a substantial liquid seal for the joint. The coupling permits two pieces of corrugated pipe to be joined relatively inexpensively and quickly by workers in the field.

8 Claims, 2 Drawing Sheets

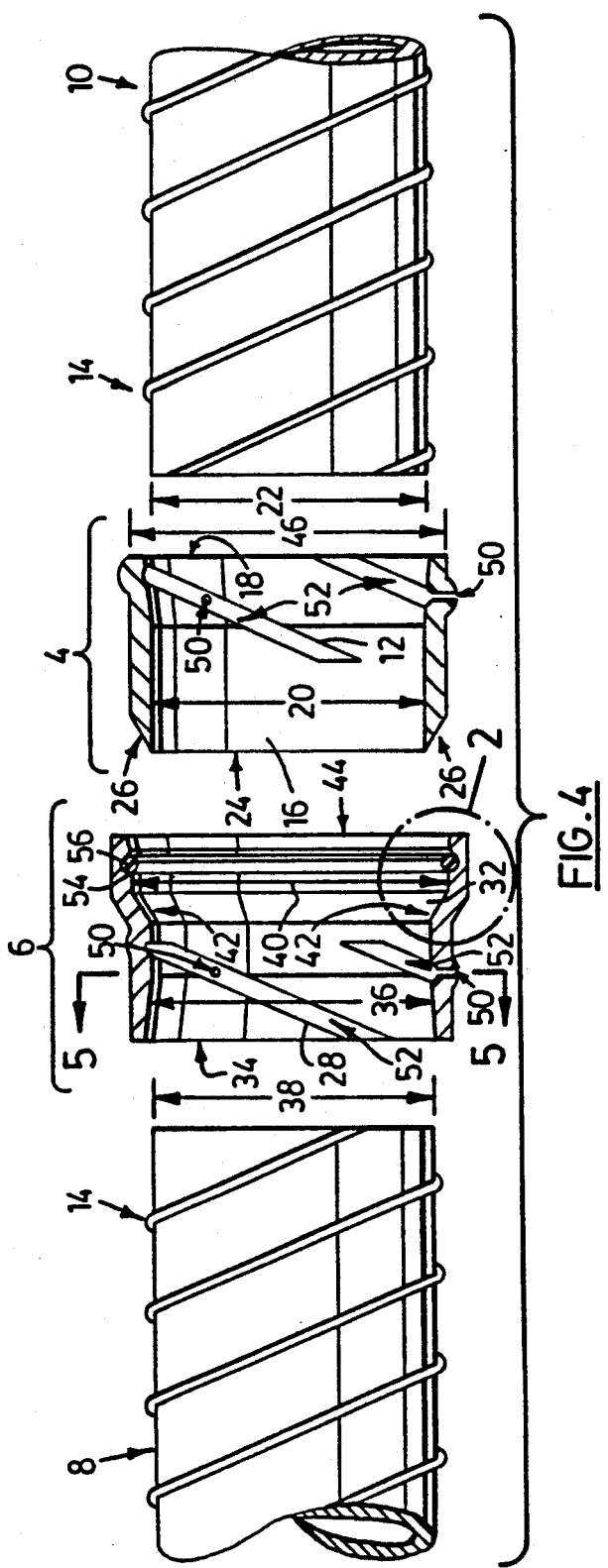
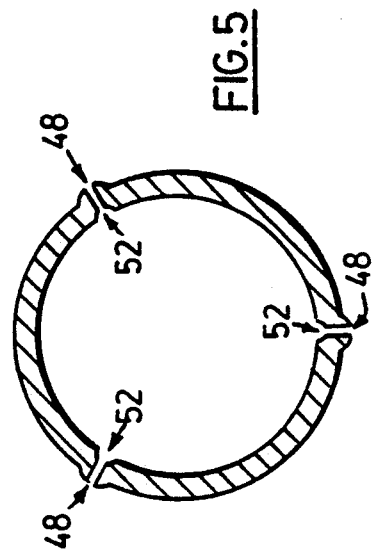

STAB JOINT COUPLER

FIELD OF INVENTION

This invention relates to a stab joint coupling for joining corrugated pipes.

BACKGROUND OF THE INVENTION

Corrugated pipes are commonly used for drainage purposes. The following criteria should be addressed when designing a coupling device to be used for joining drainage pipes together: the coupling device's inner surface must be smooth and continuous so as to prevent debris from creating obstructions; the coupling should be water tight; the coupling device should be inexpensive to manufacture; and workers in the field should be capable of establishing the coupling with a minimum of effort.

Many coupling designs have attempted to achieve some of the above criteria. Earlier coupling designs relied primarily on bolts to couple corrugated pipes together. See, for example, U.S. Pat. No. 559,642, J.H. Watson, issued May 5, 1896; U.S. Pat. No. 897,416, J.H. Schlafly, issued Sep. 1, 1908; and U.S. Pat. No. 919,997, J. Zelch, issued Apr. 27, 1909. These designs proved unsatisfactory in providing a water tight seal and were frequently difficult to install.

A currently used coupling design involves the use of a corrugated metal band. The corrugated band of metal is positioned around the exterior of the joined pipe ends. Tightening bolts are used to secure the band into position. This coupling technique is labour intensive and time consuming to install.

Some recent coupling designs no longer rely primarily on the use of bolts to secure the coupling. In U.S. Pat. No. 4,913,473, E.G. Bonnema et al., issued Apr. 3, 1990, a plastic pipe with an inherent coupling device is disclosed. The plastic pipe is double-walled. The inner wall is cylindrical and smooth. The outer wall is corrugated with annular ribs. One end of the pipe functions as a male connector. The opposite end of the pipe functions as a female connector and has an enlarged sleeve moulded to its outer wall. The sleeve has a plurality of hinged latching members which are circumferentially spaced. When the male and female connectors are joined the latching members on the female connector engage the grooves between the annular ribs on the outer wall of the male connector. Once engaged, the pipes cannot be pulled apart unless the latching members are disengaged.

The Bonnema invention is restricted to double walled plastic pipes. Plastic pipes are not suitable for certain applications. Furthermore, the male and female connectors in the Bonnema invention are inherent to the pipe; consequently, the lengths of the pipes are dependent upon the manufacturing process.

In U.S. Pat. No. 4,222,594, H.J. Skinner, issued Sep. 16, 1980, a coupling device for joining corrugated pipes is disclosed. The coupling device is comprised of a male and female connector. At one end of the male connector there is at least one annular rib on its outer surface. A corresponding number of annular grooves are provided on the inner surface of one end of the female connector. The two connectors are coupled by inserting the male connector into the female connector at an angle and then swinging the male connector in line with the female connector.

A significant disadvantage of the Skinner coupling device is that it requires the worker in the field to perform many difficult physical manipulations in order to effect the coupling. First, the patent discloses that the male and female connectors must be connected, possibly screwed, to the ends of the pipes. Second, the male connector must be screwed into the female connector at an angle so that an annular rib is positioned in an annular groove. Third, the female connector must be maintained at a fixed position while the male connector is swung in line with the female component. Fourth, at the same time as the male connector is being swung in line with the female connector, the male connector must be pushed into the female connector. Clearly, the difficulty involved in performing these manipulations increases with the diameter and weight of the pipes to be joined. Furthermore, the coupling of a plurality of pipes using the Skinner coupling device is time consuming and requires excessive manpower.

The present invention uses a stab joint to couple the male and female connectors. Also, the connectors are made of a light weight material. Therefore, complex manipulations are not required to engage the connectors and the coupling of pipes can be performed relatively inexpensively and quickly by workers in the field. The coupling has an inner surface which is smooth and continuous; thereby, providing a conduit that will not impede the flow of fluids through coupled pipes. Furthermore, the coupling provides a liquid seal.

In addition, the present invention does not require that the pipes be cut to a predetermined length in order to effect coupling. The connectors may be used to join pipes of any sufficient length that allows the connectors to be securely connected to the pipes.

SUMMARY OF THE INVENTION

The present invention provides a stab joint coupling for the ends of two corrugated pipes. The stab joint coupling comprises a male connector having means for attachment to an end of a first piece of pipe by engaging the corrugation of the pipe. A female connector has means for attachment to an end of a second piece of pipe by engaging the corrugation of the pipe. A circumferential elastomeric sealing means is insertable between the joined connectors substantially to effect a liquid seal for the joint.

These and further features of the invention will be described with reference to the accompanying drawings.

BRIEF DESCRIPTION OF THE DRAWINGS

FIG. 4 is a disassembled sectional view of the stab joint coupling, along its longitudinal axis, used as a coupler to connect abutted ends of two sections of spirally corrugated pipe.

FIG. 5 is a sectional view of the taken along line 5—5 of FIG. 4.

With reference to FIG. 1, there is shown a stab joint coupling 2 for spirally corrugated metal pipe comprising a male connector 4 and a female connector 6. The stab joint coupling 2 joins together the ends of two spirally corrugated metal pipes 8 and 10. Both the male connector 4 and the female connector 6 are made of a plastic or composite plastic material, preferably a material having a degree of elasticity which aids the attachment of each connector to a pipe end. For use in association with galvanized steel pipe, a low density polyethylene plastic is preferred for the connectors 4 and 6.

Referring to FIG. 4, the male connector 4 has an inner spirally grooved surface 12 engagable with an outer spiral rib 14 of the corrugated pipe 10. The non-grooved inner surface 16 of the male connector 4 is continuously smooth.

Figure 1:
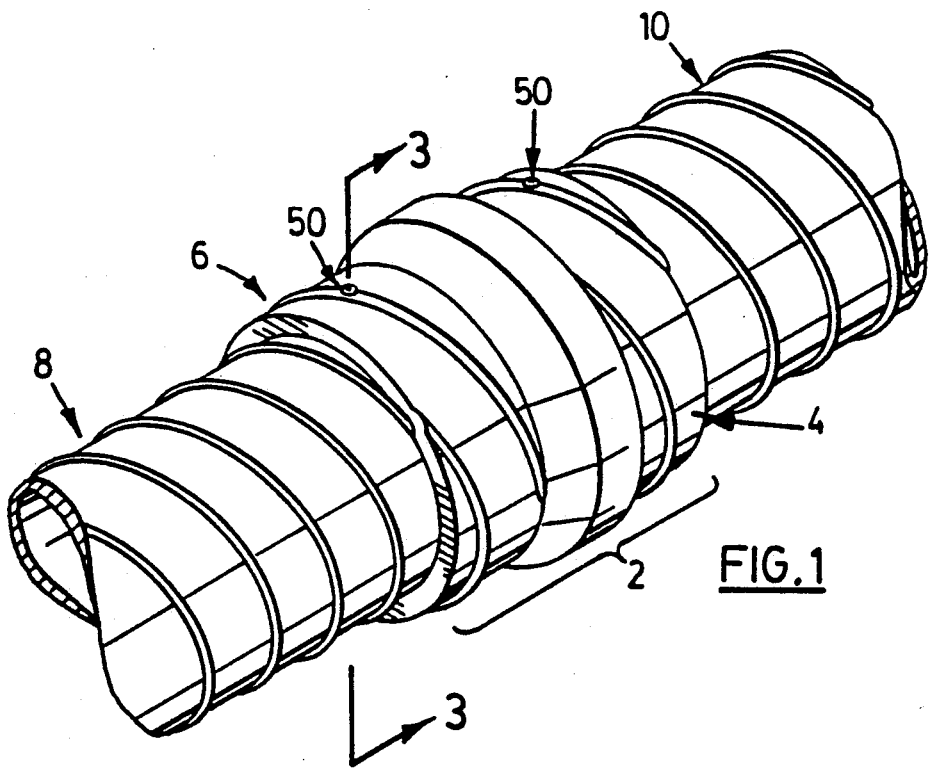
FIG. 1 is a perspective view of the stab joint coupling connecting to ends of spirally corrugated pipe.

Preferably, the spirally grooved end 18 of the male connector 4 is belled, so that the inner diameter 20 at the end 18 of the male connector 4 is larger than the outer diameter 22 of the end of the corrugated pipe 10. The inner diameter 20 of the male connector 4 decreases along the length of the connector 4 away from the end 18 until the inner diameter 20 equals the outer diameter 22 of the corrugated pipe 10. The other end 24 of the male connector 4 preferably has a bevelled edge 26.

The female connector 6 has an inner spirally grooved surface 28 engagable with the outer spiral rib 14 of the corrugated pipe 8. The non-grooved inner surface 32 of the female connector 6 is continuously smooth but for an annular groove 54 described below.

Preferably, the spirally grooved end 34 of the female connector 6 is belled, so that the inner diameter 36 at the end the female connector 6 is larger than the outer diameter 38 of the end of the corrugated pipe 8. The inner diameter 36 of the female connector 6 decreases along the length of the connector 6 away from the end 34 until the inner diameter 36 equals the outer diameter 38 of the corrugated pipe 8. Further along the length of the female connector 6, the inner diameter 36 is stepped outward to a receiving end 44 with a receiving diameter 40 accommodating the outer end 24 of the male connector 4. The annular slanted surface 42 of the female connector 6 is angled to provide an abutting surface for the bevelled edge 26 of the male connector 4 upon coupling (see FIG. 2).

Preferably, the receiving end 44 of the female connector 6 is belled, so that the receiving diameter 40 increases along the length of the connector 6 to the opening of receiving end 44, where the receiving diameter 40 is greater than the outer diameter 46 of the accommodated outer end of the male connector 4.

Referring to FIGS. 1, 3, 4 and 5, a set of circumferentially spaced holes 48 for the placement of self-drilling and self-tapping screws 50 are provided on the spirally grooved ends 18 and 34 of both the male and female connectors. The holes are located radially in the grooves 52.

Figure 2:
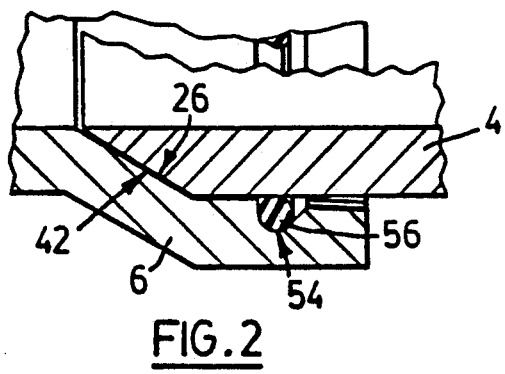
FIG. 2 is a detail view of area 2 of the female connector in FIG. 4 coupled with the male connector.
Figure 3:
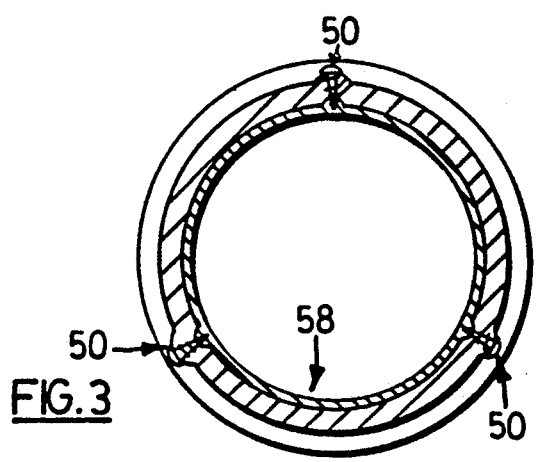
FIG. 3 is a sectional view taken along line 3—3 of FIG. 1.

Referring to FIGS. 2 and 4, the inner surface of the receiving end 44 of the female connector 6 has an annular groove 54. An elastomeric ring with a circular cross section 56 is positioned in the annular groove 54. The annular groove 54 is located in the receiving end 44 so that when the coupling is formed the ring 56 provides a seal between the male connector 4 and the female connector 6 (see FIG. 2). The ring 56 is preferably made of an elastomeric material having a degree of elasticity which permits the ring to compress when the coupling is formed creating a substantial liquid seal for the joint. In addition to the seal, the ring 56 coacts with the groove 54 and the male connector 4 to resist separation of the joined connectors 4 and 6.

Referring again to FIG. 4, after the male and female connectors 4 and 6 are attached to pipes 8 and 10, a stab joint coupling is formed by inserting the male connector 4 into the receiving end 44 of the female connector 6 along a longitudinal axis until the bevelled edge 26 of the male connector 4 abuts the annular slanted surface 42 of the female connector 6 (see FIG. 2). As seen from FIG. 3, the inner surface 58 of the coupling 2 is continuously smooth.

While the invention has been described with reference to a spirally corrugated pipe, the skilled person will appreciate that the scope of invention includes variants not specifically described but which are covered by the appended claims.

I claim:

1. A stab joint coupling for spirally corrugated metal drainage pipe, comprising:
    (a) a male connector having means for attachment to an end of a first piece of pipe by engaging the corrugation of the pipe, the attachment means being a spirally grooved inner surface for the connector;
    (b) a female connector having means for attachment to an end of a second piece of pipe by engaging the corrugation of the pipe, the attachment means being a spirally grooved inner surface for the connector; and
    (c) a circumferential elastomeric sealing means positioned between the joined coupling connectors to effect a substantial liquid seal for the joint.

2. A stab joint coupling as recited in claim 1, wherein the male and female connectors are made of a plastic or composite plastic material.

3. A stab joint coupling as recited in claim 1, wherein the circumferential elastomeric sealing means comprises an annular groove located on an inner surface of the female connector and an elastomeric ring is provided in the annular groove, so that when the male connector is inserted into the female connector, a substantial liquid seal for the joint is formed.

4. A stab joint coupling as recited in claim 1, wherein an end of both the male and female connectors is belled to permit the ends to engage the corrugation of the pipe more easily.

5. A stab joint coupling as recited in claim 1, wherein an end of the female connector which receives the male connector is belled to permit the female connector to receive the male connector more easily.

6. A stab joint coupling as recited in claim 1, wherein the male and female connectors are made of a plastic or composite plastic material having a degree of elasticity which aids the attachment of each connector to the pipe.

7. A stab joint coupling as recited in claim 6, wherein the metal pipe is made of steel.

8. A stab joint coupling as recited in claim 1, wherein the grooved inner surface of the ends of both the male and female connectors that engage the corrugation of the pipes have circumferentially spaced radial holes for the placement of self-drilling and self-tapping screws to secure the connectors to the pipes.

* * * * *